United States Patent [19]

Stoltz

[11] Patent Number: 4,603,578

[45] Date of Patent: Aug. 5, 1986

[54] SIDE ENTRY SUB WITH TENSION RELEASE WIRELINE CABLE CLAMP

[75] Inventor: John W. Stoltz, Fort Worth, Tex.

[73] Assignee: Gearhart Industries, Inc., Ft. Worth, Tex.

[21] Appl. No.: 659,251

[22] Filed: Oct. 10, 1984

[51] Int. Cl.⁴ .............................................. E21B 17/00
[52] U.S. Cl. ........................................ 73/151; 166/242
[58] Field of Search ...................... 248/74.1; 285/1, 2, 285/119; 166/117.5, 242; 24/525, 569; 73/151

[56] References Cited

U.S. PATENT DOCUMENTS

| | | | |
|---|---|---|---|
| 4,064,953 | 12/1977 | Collins | 285/2 |
| 4,388,969 | 6/1983 | Marshall et al. | 166/242 |
| 4,506,729 | 3/1985 | Davis, Jr. et al. | 166/242 |

Primary Examiner—Stewart J. Levy
Assistant Examiner—Robert R. Raevis
Attorney, Agent, or Firm—Hubbard, Thurman, Turner & Tucker

[57] ABSTRACT

Disclosed is a side entry sub with tension release wireline cable clamp. The side entry sub includes a tubular member having a port for the passage of the wireline cable into the interior of the tubular member. A cable clamp holder is positioned on the tubular member adjacent the port. The cable clamp holder has an axially extending passage with a cable clamp mounted therein. The cable clamp includes two clamp parts that are adapted to grip the cable therebetween. The cable clamp parts are movable from a gripping position to a releasing position responsive to axial movement with respect to each other in the clamp holder passage.

11 Claims, 6 Drawing Figures

SIDE ENTRY SUB WITH TENSION RELEASE WIRELINE CABLE CLAMP

BACKGROUND OF THE INVENTION

A. Field of the Invention

The present invention relates generally to a drill string sub having a side entry port for insertion and removal of wireline cable and more particularly to a side entry sub with a tension release wireline cable clamp.

B. Description of the Prior Art

The drilling and completion of oil or gas wells commonly involves the use of apparatus made up of a drill string having a steering tool or a plurality of logging tools positioned within or affixed to the drill string near its lower end. A communication wireline cable is often used for transmitting to the surface the information gathered by such tools.

Devices known as "mud motors" or "turbo drills" are often employed during well drilling operations. These devices are attached at the lower end of the drill string above the bit. During mud motor drilling operations, high pressure drilling mud is circulated down the interior of the drill string, through the mud motor and bit and up the annulus of the well bore. The action of the mud in the mud motor rotates the bit without rotating the drill string. Mud motor drilling is particularly useful in the drilling of deviated holes where the bit may be kicked out by the use of a bent sub. During such mud motor drilling operations, a steering tool is often positioned inside the drill string above the mud motor. The steering tool monitors the inclination and azimuth of the well bore during drilling, so that course corrections may be continuously made.

Additionally, there has recently been developed a system for logging a zone of interest by the use of drill pipe. Conventional open hole wireline logging of highly deviated or bad holes is often impossible because logging tools cannot be lowered into the zone of interest by gravity. Pump-down techniques, often used in highly deviated holes, are both time consuming and expensive.

One method for establishing communication with steering or down hole logging tools in drill pipes involves insertion of a wireline cable through a port in an element of the drill string known as a "side entry sub" to form a hard wire link between the down hole tool and the surface. Thus, a fixed length of cable is contained within the drill string below the side entry sub. The cable between the side entry sub and the surface extends outside the drill string.

One benefit of the wireline cable's entry through a side entry sub stems from the fact that new drill pipe sections may be added to the drill string without first withdrawing the cable from the well bore. In contrast, if the wireline cable is run totally inside the drill string from the surface to the down hole tool, the most feasible method for adding a pipe section to the drill string involves the complete removal of the cable from the drill string, followed by addition of the new pipe section, and reinstallation of the cable. Inclusion of a side entry sub in the drill string renders unnecessary such repeated cable reinstallation, increasing the speed of operation, and lowering its cost.

Typically, in the case of logging, the bottom hole tools are assembled and then lowered into the hole on drill pipe to a depth directly above the interval of open hole to be logged. The logging cable is passed through the port of the side entry sub and connected with an electrical connector or latch. The sub is then made up to the drill string and the latch and cable are lowered or pumped down inside the drill string to the logging assembly. Once the logging cable is latched to the logging assembly, the cable is clamped mechanically to the side entry sub, whereupon additional lengths of drill pipe may be made up and lowered into the hole.

When the cable is in place, it is possible to circulate through the drill string and reciprocate the drill string. However, it may be desired to remove the cable from the drill string during drilling or logging operations, for example, if the cable becomes damaged. Another important reason for removing the cable would be to vacate the drill pipe after it has become stuck. Retaining a length of cable inside such drill pipe would severly hamper the running of tools, such as free-point indicators and explosive devices, down the interior of the drill string. Also, if the drill string must be rotated, the portion of cable extending along the outside of the drill string and running to the surface would probably be damaged and would severly interfere with drill string rotation. When it is desirable to remove the cable from the drill string, the cable usually is removed by retrieving it through the port in the side entry sub.

The presently existing side entry sub cable clamp includes a pair of clamp parts that are fastened about the cable by bolts or the like. The fastened together clamp parts are in turn connected by shear pins to the side entry sub. When it is desired to retrieve the cable, a tension force is exerted on the cable sufficient to shear the shear pins and the cable and sheared clamp parts are pulled to the surface. When the clamp parts reach the surface, they are removed from the cable and the cable is then pulled the rest of the way out of the hole.

The removal of the clamp parts is a time consuming operation. The reeling up of the cable must be slowed down when it is expected that the clamp parts will reach the surface and must be stopped entirely when the clamp parts are removed. Since the pulling of the cable is normally pursuant to some emergency, time is of the essence.

Accordingly, it is an object of the present invention to provide a side entry sub with a tension releasable cable clamp that does not have to be removed from the cable as the cable is pulled from the hole. It is a further object of the present invention to provide a side entry sub with a tension releasable cable clamp wherein the cable clamp remains with the side entry sub after the cable is released.

SUMMARY OF THE INVENTION

Briefly stated, the foregoing and other objects are accomplished by the side entry sub of the present invention. The side entry sub includes an elongated tubular member having a port formed therein for the running of a cable from the exterior into the bore of the tubular member. A clamp holder is positioned on the tubular member axially adjacent the cable port. The clamp holder has an axially extending passage within which is mounted a cable clamp. The cable clamp includes first and second parts, each of which includes a cable gripping surface adapted to grip the cable. The cable clamp is normally fixed against axial movement within the clamp holder passage by shear bolts. When the cable clamp is so fixed, the clamp parts are held in gripping relationship with the cable. Upon the application of a tension force above a preselected amount, the shear bolts shear and allow the cable clamp to move axially within the clamp holder passage. Movement of the clamp causes the clamp parts to move out of gripping relationship with the cable and thereby allow the cable to be pulled freely out of the cable port while the clamp parts remain in the cable clamp holder.

One of the cable clamp parts is axially longer than the other part, but both are shorter than the length of the clamp holder passage. The cable clamp parts are held together by an arrangement which allows axial movement therebetween and lateral movement responsive to such axial movement. More specifically, one of the cable clamp parts has a plurality of inclined bolt holds, which are adapted to receive plurality of inclined holes. Each of the bolts has a threaded shank and enlarged head. The other clamp part has a plurality of elongated apertures with each aperture including an elongated counterbore with a sloping bottom. The bolt shanks are axially slidingly received in the apertures and the bolt heads are axially slidingly received in the counterbores. Axial movement between the clamp parts causes the bolt heads to go into and out of engagement with the sloping bottoms of the counterbores. Thus, in one position the heads of the bolts engage the bottoms of the counterbore and hold the cable clamp parts in gripping relationship. When the cable clamp parts are moved axially with respect to each other, the bolt heads move out of engagement with the counterbore bottoms and allow the cable clamps to release.

The axial movement between the cable clamp parts with respect to each other is provided by a stop shoulder in the cable clamp holder passage in combination with the differing lengths of the cable clamp parts. When the cable clamp parts are restrained against axial movement in the cable clamp holder passage, the bolt heads are in tight engagement with the counterbore bottoms. One end of the cable clamp part having the apertures and counterbores extends axially outward of the end of the other part. Upon release of the shear bolts, the cable clamp parts move together toward the stop shoulder in the cable clamp passageway. The end of the cable clamp holder having the apertures and counterbores strikes the stop shoulder first and stops while the other cable clamp part continues to move. The continued movement of the other cable clamp part causes the bolt heads to move out of engagement with the counterbore bottoms.

DESCRIPTION OF THE PREFERRED EMBODIMENT

Figure 1:
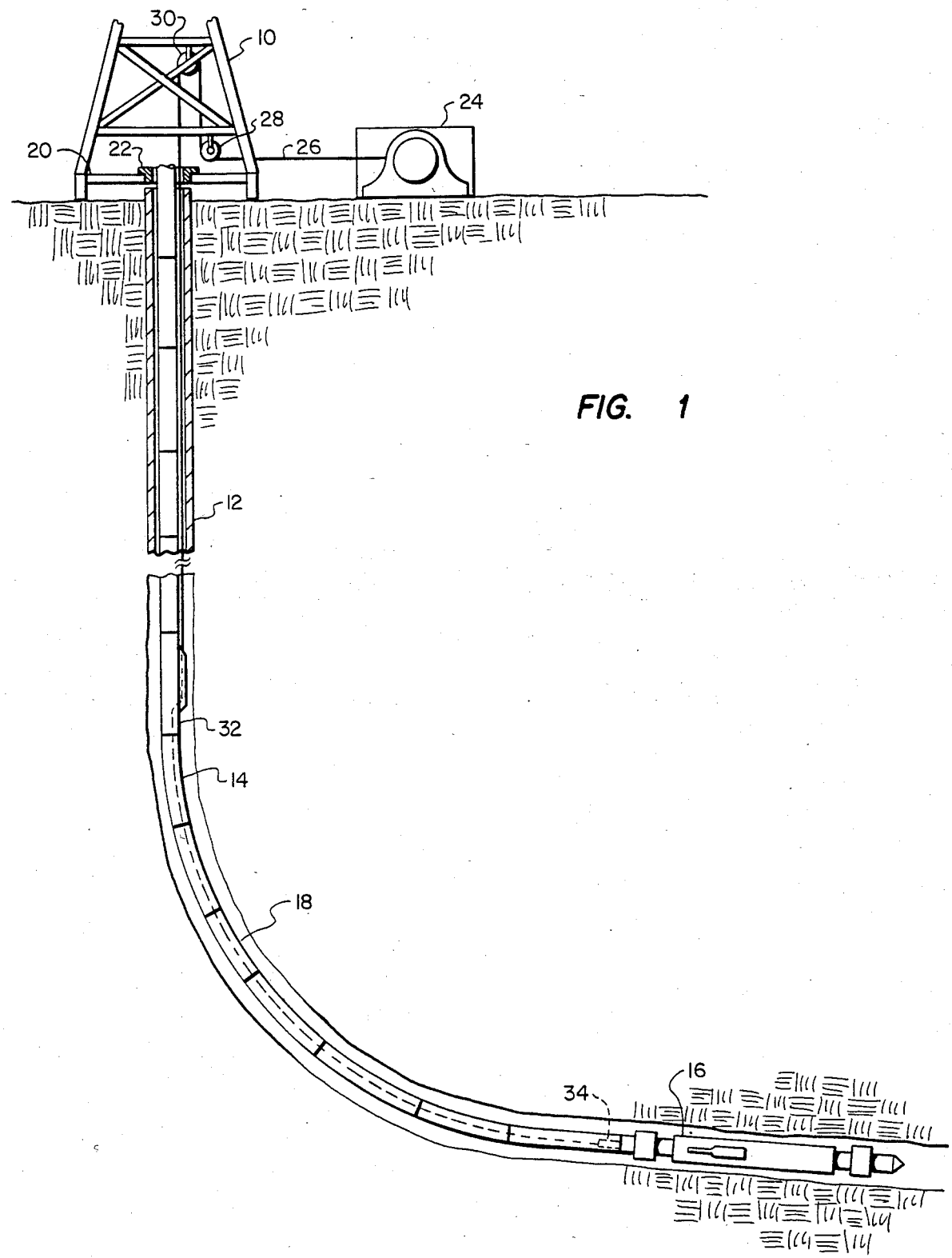
FIG. 1 is a schematic view of a deviated well bore showing the environment of the present invention.

Referring now to the drawings, and first to FIG. 1, a drilling rig 10 is shown above a well bore 12. The lower portion of well bore 12 is deviated at a high angle away from the vertical. An elongated drill string 14 extends down into well bore 12 and has a logging tool assembly 16 attached to its lower end. Drill string 14 is made up of a plurality of end-to-end connected sections of pipe, each designated by the numeral 18.

Drill string 14 extends down through the floor 20 of rig 10 into well bore 12. A conventional rotary table and slip assembly 22 for rotating and supporting drill string 14 is shown. A power wench assembly 24 is connected to an elongated flexible cable or wireline 26 and is suitable for paying out or reeling in the cable. Cable 26 passes over suitable sheaves 28 and 30 in rig 10 and into well bore 12 adjacent drill string 14. A side entry sub 32 is provided in drill string 14 so that cable 26 may enter the interior of drill string 14.

In positioning logging tool assembly 16 for performing log operations, or other procedures in accordance with the particular type of tool being used, the tool is typically lowered to the upper portion of the zone of the well bore to be surveyed and the side entry sub 32 is added to drill string 14. Wireline cable 26 is then inserted through a suitable port in side entry sub 32 and lowered or pumped down the interior of drill string 14 for connection to logging tool assembly 16 by means of a latch or connector assembly, designated in phantom by the numeral 34. The details of latch 34 are not a part of the present invention and it will suffice to say that the latch may be withdrawn with the cable through the cable port in a side entry sub 32 or, alternatively, the wireline cable may be provided with a weak link which will permit the cable to part at a point within the interior of the drill string when subjected to a predetermined tension force. In this way, the main portion of cable 26 may be withdrawn from the interior of the drill string through side entry sub 32. This procedure is necessary, particularly in regard to operations with drill strings in angled or deviated well bores, since it may be necessary to rotate the drill string to unstick it or to carry out some other operation.

If the drill string is rotated with the wireline cable in place through the side entry sub, the portion of the wireline cable extending up the well bore between the side entry sub and the rig floor may become entangled and limit the rotation of drill string, or the cable may break. It is therefore desirable to withdraw the cable prior to any rotation of the drill string. However, it is desirable during normal operations that the cable be firmly clamped to the side entry sub.

Figure 2:
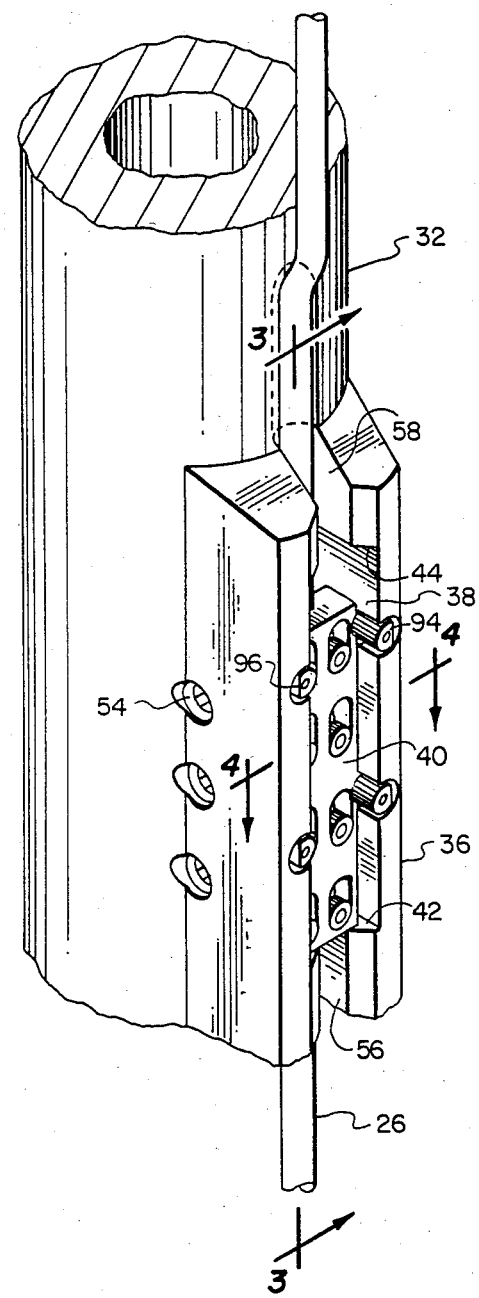
FIG. 2 is a perspective view of a portion of the side entry sub of the present invention.

Referring now to FIG. 2, side entry sub 32 includes an elongated cable clamp holder 36. Cable clamp holder 36 includes an elongated axially extending passage 38 which has mounted therein a cable clamp 40. Cable clamp 40 is slidable within passage 38 between a first end 42 and a second end 44.

Figure 4:
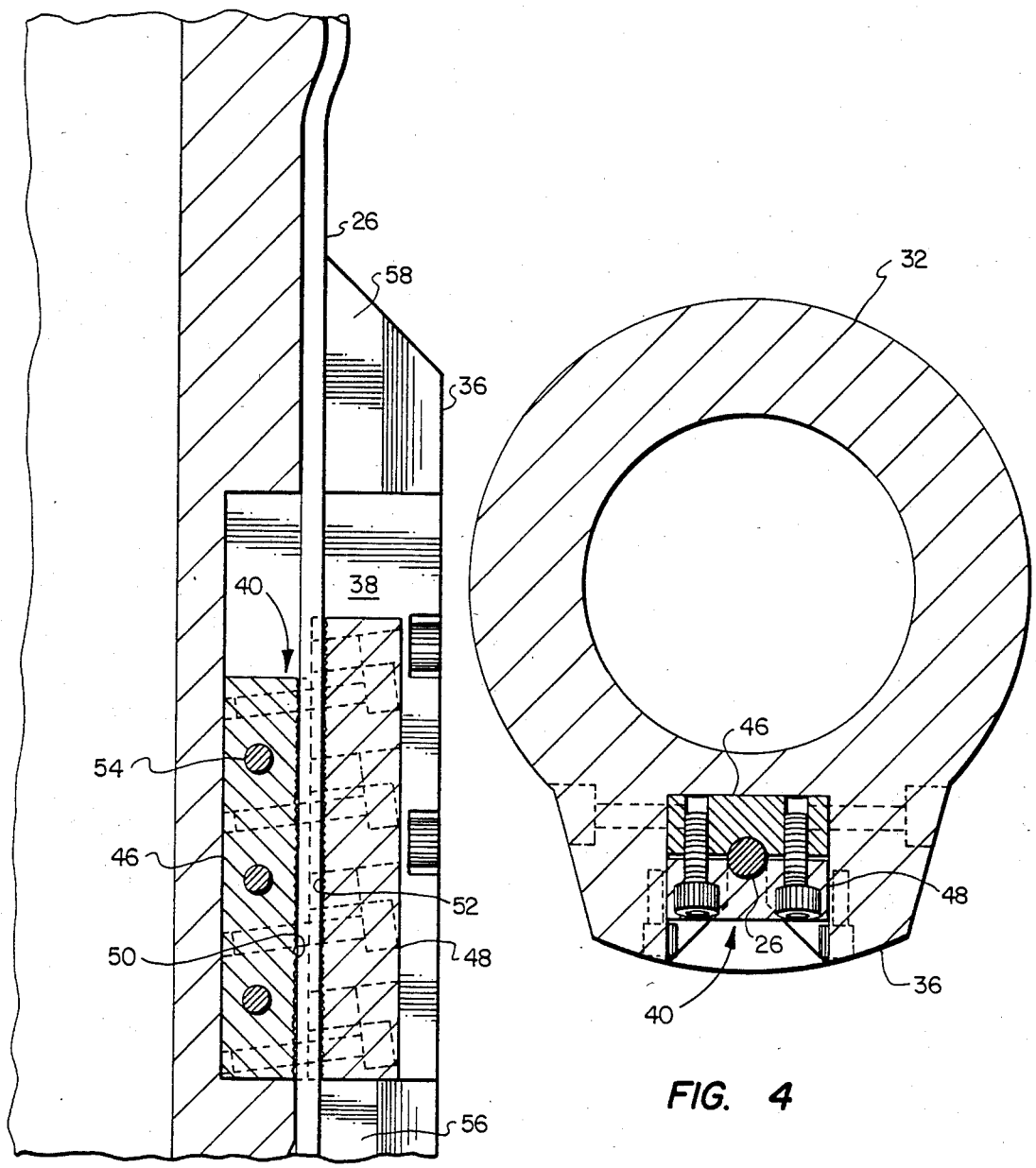
FIG. 4 is a sectional view taken generally along line 4—4 of FIG. 2.
Figure 3:
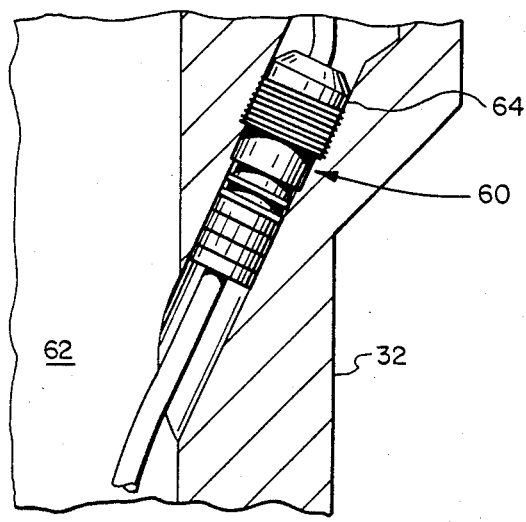
FIG. 3 is a sectional view taken generally along line 3—3 of FIG. 2.

Referring now to FIGS. 3 and 4, cable clamp 40 includes a first part 46 and a second part 48. First part 46 and second part 48 each include elongated semicylindrical cable gripping surfaces 50 and 52, respectively, which are adapted to grip cable 26. Cable gripping surfaces 50 and 52 preferably have a knurled or gripping finish so as to enhance their gripping ability as will be explained in detail hereinafter.

First part 46 and second part 48 of cable clamp 40 are normally held in gripping relationship with cable 26. Cable clamp 40 is normally fixed against axial movement within passage 38 of cable clamp holder 36 by means of shear bolts, including, for example, shear bolt 54. The shear bolts engage the sides of cable clamp holder 36 and first part 46 of cable clamp 40. The shear bolts normally hold first part 46 and second part 48 of cable clamp 40 against first end 42 of passage 38 of latch holder 36.

Cable clamp holder 36 includes on either side of passage 38 cable guideways 56 and 58. Adjacent lower cable guideway 56, side entry sub 32 includes a port, designated generally by the numeral 60, for the passage of cable 26 from the exterior of side entry sub 32 into the bore 62 of side entry sub 32. Port 60 is defined by an insert 64, which includes suitable seals and which may include a valve mechanism for closing the port when cable 26 is withdrawn therefrom.

Figure 5A:
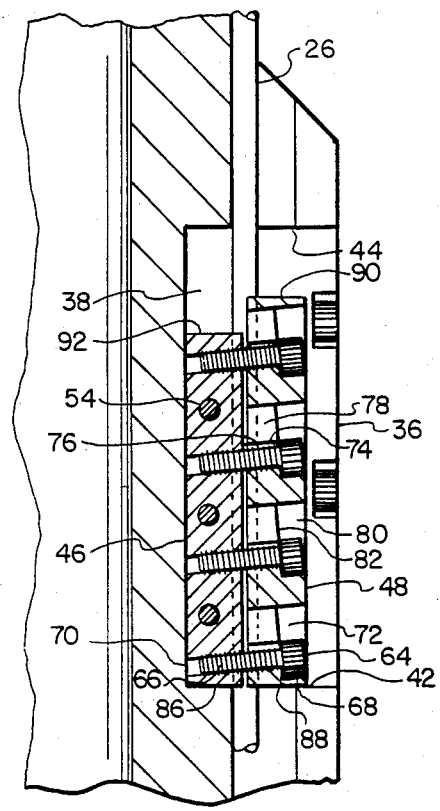
FIG. 5A is a partial sectional view showing details of the cable clamp of the present invention in gripping relationship with a cable.

Referring now to FIG. 5A, first part 46 and second part 48 of cable clamp 40 are held together by means of a plurality of bolts 64. Each bolt includes a threaded shank 66 and an enlarged head 68. The shanks 66 of bolts 64 are received in threaded bolt holes 70 in first part 46 of clamp 40. Bolt holds 70 and bolts 64 are inclined axially in the direction toward second or upper end 44 of passage 38 of cable clamp holder 36.

Second part 48 of clamp 40 is connected to first part 46 by means of a plurality of apertures 72, which engage bolts 64. Each aperture 72 includes an elongated slot 74 which axially slidingly receives shank 66 of bolt 64. Slot 74 is keyhole shaped and includes an elongated first portion 76 having a width less than the diameter of head 68 of bolt 64 and a circular second portion 78 having a diameter substantially the same as that of head 68.

Each aperture 72 includes an elongated counterbore 80 which slidingly receives heads 68 of bolts 64. Each counterbore 80 has a floor 82 which slopes inwardly and upwardly toward first part 46 of clamp 40.

Second part 48 of clamp 40 is longer than first part 46. As shown in FIG. 5A, when clamp 40 is in gripping relationship with cable 26, the first ends 86 and 88 respectively of first part 46 and second part 48 abut lower or first end 42 of passage 38. The heads 68 of bolts 64 firmly engage the floors 82 of counterbores 80, thereby holding first part 46 and second part 48 of clamp 40 together in gripping relationship with cable 26. Clamp 40 is restrained against axially upward movement by shear bolts 54.

Figure 5B:
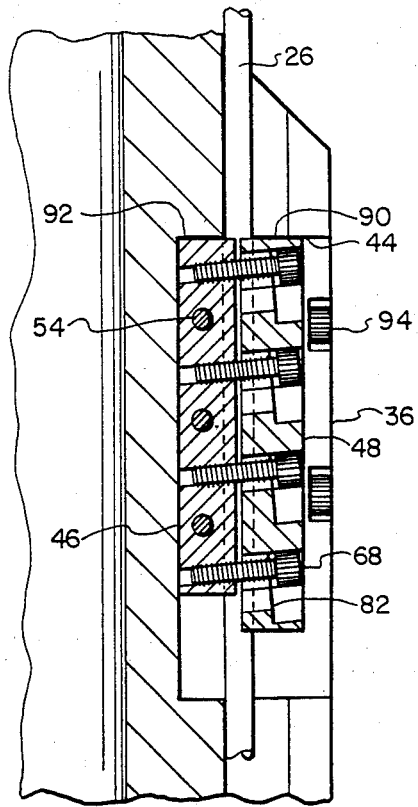
FIG. 5B is a sectional view showing details of the cable clamp of the present invention in releasing relationship with the cable.

When it is desired to release clamp 40 and retrieve cable 26, an upward tension is applied to cable 26. When the upward tension exceeds a predetermined amount, shear bolts 54 shear and release the connection between first portion 46 of clamp 40 and clamp holder 36. The release of the connection allows clamp 40 to move axially in passage 38 toward second end 44. Since second part 48 of clamp 40 is longer than first part 46, its second end 90 contacts second end 44 of passage 38 before the second end 92 of first part 46. The contact of second end 90 of second part 48 causes second part 48 to stop. However, first part 46 continues to move axially until its second end 92 contacts second end 44 of passage 38 as shown in FIG. 5B. The axial movement between second part 48 and first part 46 causes the heads 68 of the bolts 64 to move out of engagement with the floors 82 of the counterbores 80. Such movement thereby allows second part 48 to move away from first part 46 and out of gripping relationship with cable 26.

Cable 26 may thus be pulled freely out of side entry sub 32. A plurality of retainers 94 are provided in cable clamp holder 36 to keep second part 48 from falling out after release of cable 26. As is best shown in FIG. 2, each retainer 94 has a generally cylindrical head having a flat side 96.

In operation, drill string 14 with logging tool assembly 16 connected thereto is run into well bore 12, to a point above the zone of interest. Side entry sub 32 is then inserted in the drill string and cable 26 is run into side entry sub 32 through port 60. Cable 26 is then lowered or pumped down drill string 14 until latch 34 connects with logging tool assembly 16. With latch 34 so connected, cable 26 is positioned between first part 46 and second part 48 of cable clamp 40. Preferably, cable clamp 40 is assembled by inserting the heads 68 of the bolts 64 through the round portions 78 of apertures 72 and then sliding second part 48 of cable clamp 40 axially until the first ends 86 and 88 of first part 46 and second part 48, respectively, coincide. Then, bolts 64 are tightened and the assembled cable clamp 40 is inserted into cable clamp holder 36 and fixed in place by shear bolts 54, as shown in FIG. 5A. The retainers 94 are then rotated to the position shown in FIG. 2. After cable 26 has been clamped to side entry sub 32, additional sections of pipe 18 may be added and run into well bore 12.

In the event that it becomes necessary to retrieve cable 26, a tension force is applied to cable 26 sufficient to shear bolts 54. With shear bolts 54 sheared, cable clamp 40 moves toward second end 44 of cable clamp holder passage 38, as shown in FIG. 5B, and releases cable 26. Retainers 94 keep second part 48 of cable clamp 40 from falling out of passage 38.

Further modification and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. A side entry sub, which comprises:
   an elongated tubular member having a pair of ends and a cylindrical wall and a longitudinal bore;
   a port formed in said wall intermediate said ends for running a cable from the exterior of said tubular member into said longitudinal bore;
   and clamp means for preventing movement of said cable axially with respect to said tubular member, said clamp means being releasable responsive to a tension force on said cable greater than a preselected amount to allow said cable to move freely axially with respect to said tubular member with said clamp means being retained with said elongated tubular member after release of said cable.

2. The side entry sub as claimed in claim 1, wherein said clamp means includes:

a first part and a second part with said cable being positionable therebetween;

means for holding said first and second parts in gripping relationship with said cable;

and means responsive to said greater than preselected tension force on said cable for at least partially releasing said holding means to allow said first and second parts to move apart from each other out of gripping relationship with said cable.

3. The side entry sub as claimed in claim 2, wherein said clamp means includes:

releasable means for fixing said first part to said tubular member and for allowing said first part to move axially with respect to said tubular member in response to said greater than preselected tension force on said cable;

and said means for at least partially releasing said holding means includes means for limiting the axial movement of said first part with respect to said tubular member.

4. The side entry sub as claimed in claim 3, wherein said clamp means includes:

a clamp holder positioned on said tubular member, said clamp holder including an axially extending passage, said passage including a first end and an axially spaced second end;

said first and second parts of said clamp being slidingly mounted in said passage of said clamp holder, with said second part being axially longer than said first part;

and said releasable means for fixing said first part to said tubular member including at least one shear bolt engaging said clamp holder and said first part to releasably hold one end of each of said first and second parts against said first end of said clamp holder passage.

5. The side entry sub as claimed in claim 1, wherein said clamp means includes:

a clamp holder positioned on said tubular member axially spaced apart from said port, said clamp holder including an axially extending passage having a first end and an axially spaced apart second end;

a first clamp part slidingly mounted in said clamp holder passage, said first clamp part having first and second ends with an axial length therebetween less than the axial length of said clamp holder passage;

a second clamp part slidingly mounted in said clamp holder passage outwardly of said first clamp part, said second clamp part having first and second ends with an axial length less than the length of said clamp passage and greater than the axial length of said first clamp part;

means for connecting together said first and second clamp parts such that said second clamp part is movable outwardly with respect to said first part from a gripping position when the respective first ends of said first and second clamp parts coincide to a releasing position responsive to movement of said second end of said second part clamp axially toward said second end of said first clamp part;

and releasable means for fixing said first clamp part against axial movement in said clamp holder passage with said first ends of said first and second clamp parts in abutment with said first end of said clamp holder passage, said releasable means being releasable to allow said first and second clamp parts to move axially in said clamp holder passage with said second end of said second clamp part moving into abutment with said second end of said passage.

6. The side entry sub as claimed in claim 5, wherein said connecting means includes:

a plurality of bolts engaging said first clamp part, each of said bolts having a shank and an enlarged head, each of said bolts being inclined toward said second end of said first clamp part;

and said second clamp part including a plurality of elongated apertures with each of said apertures including an elongated counterbore having a bottom which slopes toward said second end of said second clamp part, with each of said apertures having therein one of said bolts with the head of said bolt being in the counterbore of said aperture.

7. A side entry sub, which comprises:

an elongated tubular member having a pair of ends and a cylindrical wall and a longitudinal bore;

a port formed in said wall intermediate said ends for running a cable from the exterior of said tubular member into said longitudinal bore;

a clamp holder positioned on said tubular member;

a cable clamp axially movably mounted with said clamp holder, said cable clamp including a first clamp part and a second clamp part, each of said first and second clamp parts including a cable gripping surface, said first and second clamp parts being movable with respect to each other from a gripping position wherein said cable gripping surfaces grip said cable to a releasing position werein said cable gripping surfaces release said cable;

releasable means for fixing said cable clamp in a first axial position in said clamp holder with said first and second clamp parts in said gripping position, said releasable means being releasable upon the application of a preselected axial force to said cable clamp to allow said cable clamp to move axially in said clamp holder;

and means for stopping said cable clamp at a second axial position in said clamp holder with said first and second cable clamp parts in said releasing position.

8. The side entry sub as claimed in claim 7, wherein:

said clamp holder includes an axially extending passage, said passage including a first end and an axially spaced second end;

said first and second parts of said clamp being slidingly mounted in said passage of said clamp holder, with said second part being axially longer than said first part;

and said releasable means for fixing said first part to said tubular member including at least one shear bolt engaging said clamp holder and said first clamp part to releasably hold one end of each of said first clamp part against said first end of said clamp holder passage.

9. The side entry sub as claimed in claim 7, wherein:

said clamp holder includes an axially extending passage having a first end and an axially spaced apart second end;

said first clamp part is slidingly mounted in said clamp holder passage, said first clamp part having first and second ends with an axial length therebetween less than the axial length of said clamp holder passage;

said second clamp part is slidingly mounted in said clamp holder passage outwardly of said first clamp part, said second clamp part having first and second ends with an axial length less than the length of said clamp passage and greater than the axial length of said first clamp part;

said releasable means includes at least one shear bolt engaging said clamp holder and one of said first or second cable clamp parts to hold said first ends of said first and second clamp parts in abutment with said first end of said clamp holder passage;

and said cable clamp includes means for connecting together said first and second clamp parts such that said second clamp part is movable outwardly with respect to said first part from said gripping position to a releasing position responsive to axial movement of said cable clamp toward said second end of said clamp holder passage.

10. The side entry sub as claimed in claim 9, wherein said connecting means includes:

a plurality of bolts threadedly engaging said first clamp part, each of said bolts having a shank and an enlarged head, each of said bolts being inclined toward said second end of said first clamp part;

and said second clamp part including a plurality of elongated apertures with each of said apertures including an elongated counterbore having a bottom which slopes toward said second end of said second clamp part, with each of said apertures having therein one of said bolts with the head of said bolt being in the counterbore of said aperture.

11. A side entry sub, which comprises:

an elongated tubular member having a pair of ends and a cylindrical wall and a longitudinal bore;

a port formed in said wall intermediate said ends for running a cable from the exterior of said tubular member into said longitudinal bore;

a clamp holder positioned on said tubular member axially spaced apart from said port, said clamp holdering including an axially extending passage having a first end and an axially spaced apart second end;

a first clamp part axially sliding mounted in said passage of said clamp holder, said first clamp part having first and second ends with the axial length therebetween less than the axial length of said passage of said clamp holder;

a second clamp part axially slidingly mounted in said passage of said clamp holder laterally adjacent said first clamp part, said second clamp part having first and second ends with the axial length therebetween less than the axial length of said clamp holder, said first and second clamp parts being of unequal length;

means for connecting together said first and second clamp parts such that when said first and second clamp parts are moved axially with respect to each other, they move from a gripping relationship with respect to each other to a releasing relationship with respect to each other;

and releasable means for fixing one of said first and second clamp parts against axial movement in said clamp holder passage with the first end of at least one of said first and second clamp parts in abutment with said first end of said clamp holder passage, said releasable means being releasable to allow said first and second clamp parts to move axially in said clamp holder passage with the second end of at least the other of said first and second clamp parts moving into abutment with said second end of said clamp holder passage.

* * * * *